(12) United States Patent
Kameda et al.

(10) Patent No.: US 7,361,272 B2
(45) Date of Patent: Apr. 22, 2008

(54) ANISOTROPIC POROUS MATERIAL

(75) Inventors: Tsuneji Kameda, Tokyo (JP);
Yoshiyasu Ito, Kanagawa (JP);
Takahiko Shindo, Kanagawa (JP);
Yuuji Hisazato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/592,959

(22) Filed: Nov. 6, 2006

(65) Prior Publication Data

US 2007/0104941 A1    May 10, 2007

(30) Foreign Application Priority Data

Nov. 7, 2005    (JP)    ............ P2005-322629

(51) Int. Cl.
*B01D 39/00*    (2006.01)
*B01D 24/00*    (2006.01)
*B32B 3/26*    (2006.01)

(52) U.S. Cl. ............ 210/500.25; 210/510.1; 428/314.4; 428/307.3; 428/566

(58) Field of Classification Search ........... 210/500.27, 210/500.25, 500.26, 490, 510.1, 500.41, 210/500.1, 525; 428/308.4, 314.4, 307.3, 428/566; 55/523; 419/2
See application file for complete search history.

(56) References Cited

U.S. PATENT DOCUMENTS

| | | | | |
|---|---|---|---|---|
| 4,280,909 A | * | 7/1981 | Deutsch | .......... 210/490 |
| 4,885,092 A | * | 12/1989 | Zwick | ............ 210/500.41 |
| 5,006,247 A | * | 4/1991 | Dennison et al. | ...... 210/500.38 |
| 5,094,895 A | * | 3/1992 | Branca et al. | ........ 428/36.91 |
| 5,234,594 A | * | 8/1993 | Tonucci et al. | ........ 210/500.26 |
| 5,429,743 A | * | 7/1995 | Geus et al. | ............ 210/490 |
| 5,698,101 A | * | 12/1997 | Kopp et al. | ........ 210/500.23 |
| 5,753,121 A | * | 5/1998 | Geus et al. | ............ 210/490 |

FOREIGN PATENT DOCUMENTS

| | | |
|---|---|---|
| JP | 10-235172 | 9/1998 |
| JP | 2001-225057 | 8/2001 |
| JP | 2001-259323 | 9/2001 |
| JP | 2001-259324 | 9/2001 |

* cited by examiner

*Primary Examiner*—Ana Fortuna
(74) *Attorney, Agent, or Firm*—Finnegan, Henderson, Farabow, Garrett & Dunner, L.L.P.

(57) ABSTRACT

The present invention is to provide an anisotropic porous material for a fluid filter which can perform a separation process of a large amount of fluid with high accuracy, which can achieve high flux, and which can improve detergent properties. The anisotropic porous material includes a plurality of pores. Each of the pores has an anisotropic shape in which a major axis and a minor axis can be defined. An arrangement of the pores has an orientation.

12 Claims, 7 Drawing Sheets

ANISOTROPIC POROUS MATERIAL

CROSS-REFERENCE TO RELATED APPLICATION

This application is based upon and claims the benefit of priority from the prior Japanese Patent Application No. 2005-322629, filed on Nov. 7, 2005. The entire contents of which are incorporated herein by reference.

BACKGROUND OF THE INVENTION

1. Field of the Invention

The present invention relates to an anisotropic porous material including pores having an orientation.

2. Description of the Prior Art

General porous materials are roughly classified into three typical types shown in FIGS. 1A to 1C. A first type is called a sinter-type porous material. As shown in FIG. 1A, the sinter-type porous material is formed by bonding and solidifying solid particles 1 at particle contact points. Pores 2 are formed of gaps among the solid particles 1. A second type is called a foam-type porous material. As shown in FIG. 1B, Pores 4 are formed of a partition made of a solid material 3. A third type is called a sinter-and-foam mixed phase type porous material, which is made of a mixed phase material composed of a sinter-type porous material and a foam-type porous material. As shown in FIG. 1C, the sinter-and-foam mixed phase type porous material contains pores 5 each having a form of the sinter-type porous material and pores 6 each having a form of the foam-type porous material.

These porous materials are used for a wide range of purposes, such as a filter for filtering various fluids in both a gaseous phase and a liquid phase, a heat insulator, an acoustic absorbent, and a shock absorbent. As an example, the present state of a porous membrane used for the purpose of water purification will be described in detail below.

In a water purifying plant, raw water is taken from water sources such as a river and a reservoir. Then, the raw water is treated in five unit processes including coagulation, flocculation, precipitation, filtration, and disinfection. Thereby, suspended materials and colloid materials are removed, and bacteria and the like are made harmless. Thus, clear tap water is supplied to consumers.

A method using coagulants is generally used in a series of clarifying processes by means of the coagulation, the flocculation, the precipitation and the filtration. Inorganic metal salts such as iron and aluminum are usually used as the coagulants. Effects of the coagulants are affected by various physical and biochemical factors. Thus, the optimal coagulation condition can be established only when a complex equilibrium is reached among many factors. For this reason, skill is needed to secure a certain level of treated water quality.

In October 1996, the Ministry of Health and Welfare (currently, called the Ministry of Health, Labour and Welfare) issued the "Policies concerning Temporary Measures against Cryptosporidiums Contained in Tap Water." The policies establish a regulation instructing to always read water turbidity at a filter bed outlet, and thus to keep the water turbidity at the filter bed outlet at 0.1 degree or under. Accordingly, management of the water turbidity in the water purifying plants has become a significant issue.

Against this background, research and development concerning microfiltration membranes and ultrafiltration membranes have been advanced. In Japan, membrane filtration has started to be rapidly widespread in water purifying plants. In other countries, membrane filtration water purifying plants have been already in operation, and each of the plants treats several hundreds of thousand tons of water per day. The membrane filtration using the microfiltration membrane or the ultrafiltration membrane has an advantage that good treated water quality is obtained by surely removing turbid substances.

Organic polymer membranes (for example, cellulose acetate, polysulfone, polyethylene, polypropylene and polyacrytonitrile) have been most widely used as materials for the microfiltration membrane and the ultrafiltration membrane. However, the life of the organic polymer membranes is three to five years due to performance deterioration caused by a change of properties of the membranes themselves, and due to performance deterioration caused by external factors, as its operation time increases. The change of properties of the membranes is caused by: physical deterioration such as compaction and damage of the membrane; chemical deterioration such as hydrolysis and oxidation of the membrane; biological deterioration resulting from membrane utilization by microbes; and the like. An example of the external factors is accumulation of fine particles and suspended materials on the membrane surface. Thus, the membrane filtration using the organic polymer membranes has a disadvantage of high running costs due to costs needed to exchange the membranes.

Japanese published unexamined application No. 2001-225057 discloses a technique to reduce such running costs. This technique is a water treatment system surely removing fine particles and suspended materials in the following way. First, coagulated flocs are formed by use of coagulants, and then are removed by sand filtration. Subsequently, the fine particles and the suspended materials are removed by a metal membrane filtration apparatus that is excellent in durability.

The metal membrane filtration apparatus disclosed in Japanese published unexamined application No. 2001-225057 is configured of a cylindrical element. The cylindrical element is formed of a pleated metal membrane in a nonwoven fabric state, which is obtained by sintering stacked metal fibers.

On the other hand, as a filtration membrane other than a metal membrane, porous ceramic membranes obtained by sintering fine particles are disclosed in Japanese published unexamined applications No. 2001-259324, No. 2001-259323, No. Hei 10(1998)-236887, and No. Hei 10(1998)-235172.

There are the following problems in the metal membrane filtration apparatus disclosed in Japanese published unexamined application No. 2001-225057.

(1) Reduction of Flux Due to a Nonwoven Fabric Structure

A metal membrane with a nonwoven fabric structure has a structure to capture fine particles and suspended materials not only on the surface of the metal membrane but also inside the metal membrane. Accordingly, the metal membrane has an advantage of being capable of capturing, in the inside of the membrane, the fine particles and suspended materials that cannot be captured on the surface of the metal. On the other hand, it is impossible to remove the fine particles and the suspended materials that have penetrated into the membrane by normal cleaning. Thus, the reduction of flux is facilitated, as its operation time increases.

(2) Pollution Concern Due to Adding Coagulants and Increase of the Amount of Process Matters Due to Flocculation As described above, in the case of the metal membrane, it is difficult to remove the fine particles and suspended materials that have penetrated into the membrane. For this reason, it is inevitable to perform a process of removing removable suspended substances by flocculation as much as possible in advance. This process raises a concern of pollution caused by injecting chemicals, that is, adding coagulants. Moreover, since it is necessary to waste the flocs, the amount of process matters increases.

In addition to the nonwoven fabric metal membrane obtained by sintering stacked metal fibers, a porous metal membrane obtained by sintering metal fine powder has been studied, but it also has the same problems as described above.

On the other hand, regarding to the ceramic membranes disclosed in Japanese published unexamined applications No. 2001-259324, No. 2001-259323, No. Hei 10(1998)-236887, and No. Hei 10(1998)-235172, there is a report that it is possible to form pores each having a finer diameter than that of the metal membrane, and to provide an excellent backwash. As is the case with the metal membrane described above, however, the ceramic membrane has a structure to capture the fine particles and the suspended materials not only on the surface of the membrane but also in the inside thereof, since the ceramic membrane is basically a porous body obtained by sintering fine particles in a network form. For this reason, there are also problems that it is difficult to remove the fine particles and suspended materials that have penetrated into the membrane, and that the reduction of flux is facilitated as the operation time increases. In addition, since the ceramic membrane has a structure in which pores form a complex network, pressure loss is relatively large even in initial properties.

SUMMARY OF THE INVENTION

The present invention has been made in view of the forgoing. Accordingly, an object of the present invention is to provide an anisotropic porous material enabling a fluid filter to perform a separation process of a large amount of fluid with high accuracy; to decrease the reduction of flux; and to improve the detergent properties of the filter.

The present invention is characterized by an anisotropic porous material including a plurality of pores. Each of the pores has an anisotropic shape that a major axis and a minor axis can be defined. The plurality of pores form an oriented arrangement.

An anisotropic porous material of the present invention includes a plurality of pores. Each of the pores has an anisotropic shape that a major axis and a minor axis can be defined. The plurality of pores forms an oriented arrangement. Thus, a fluid filter made of the anisotropic porous material is capable of performing the separation process of a large amount of fluid with high accuracy. Moreover, the anisotropic porous material is capable of decreasing the reduction of flux, and improving the detergent properties of the filter.

DETAILED DESCRIPTION OF THE PREFERRED EMBODIMENTS

Preferred Embodiments for implementing an anisotropic porous material of the present invention will be described below by referring to drawings.

Figure 2:
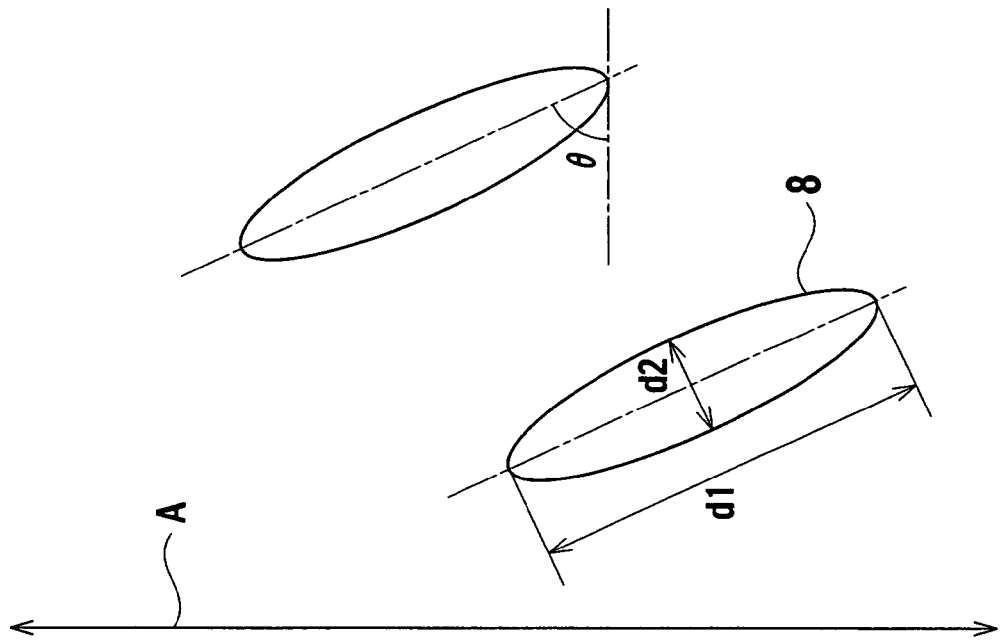
FIG. 2 is an illustration of an anisotropic porous material.
Figure 3:
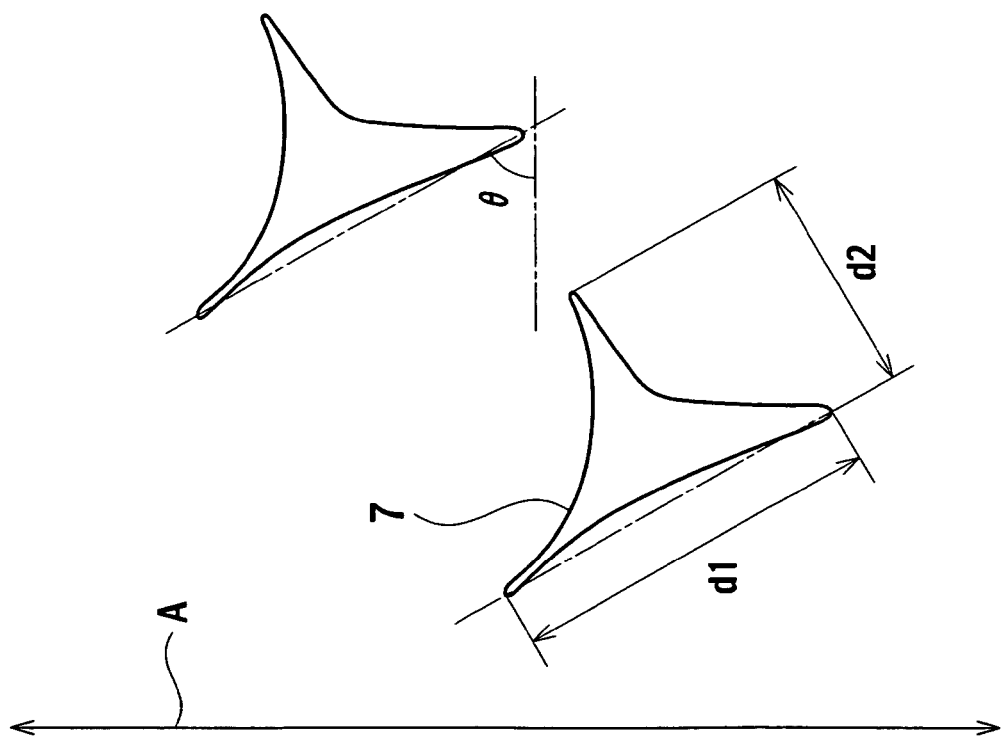
FIG. 3 is an illustration of other anisotropic porous material.

An overview of an anisotropic porous material of the present invention will be described by referring to FIGS. 2 and 3. FIGS. 2 and 3 are illustrations of an anisotropic porous material. The anisotropic porous material includes a plurality of pores. Each of the pores has an anisotropic shape in which a major axis and a minor axis can be defined, like, for example, pores 7 and 8 shown in FIGS. 2 and 3, respectively. Here, as for each of the pores 7 and 8, when a difference between an arbitrary reference orientation A and the major axis d1 is expressed with an inclination θ, the inclination θ has an orientation, that is, a tendency to be distributed in a specific range. On the other hand, a material in which pores do not have the orientation is an isotropic porous material.

First Embodiment

Figure 4:
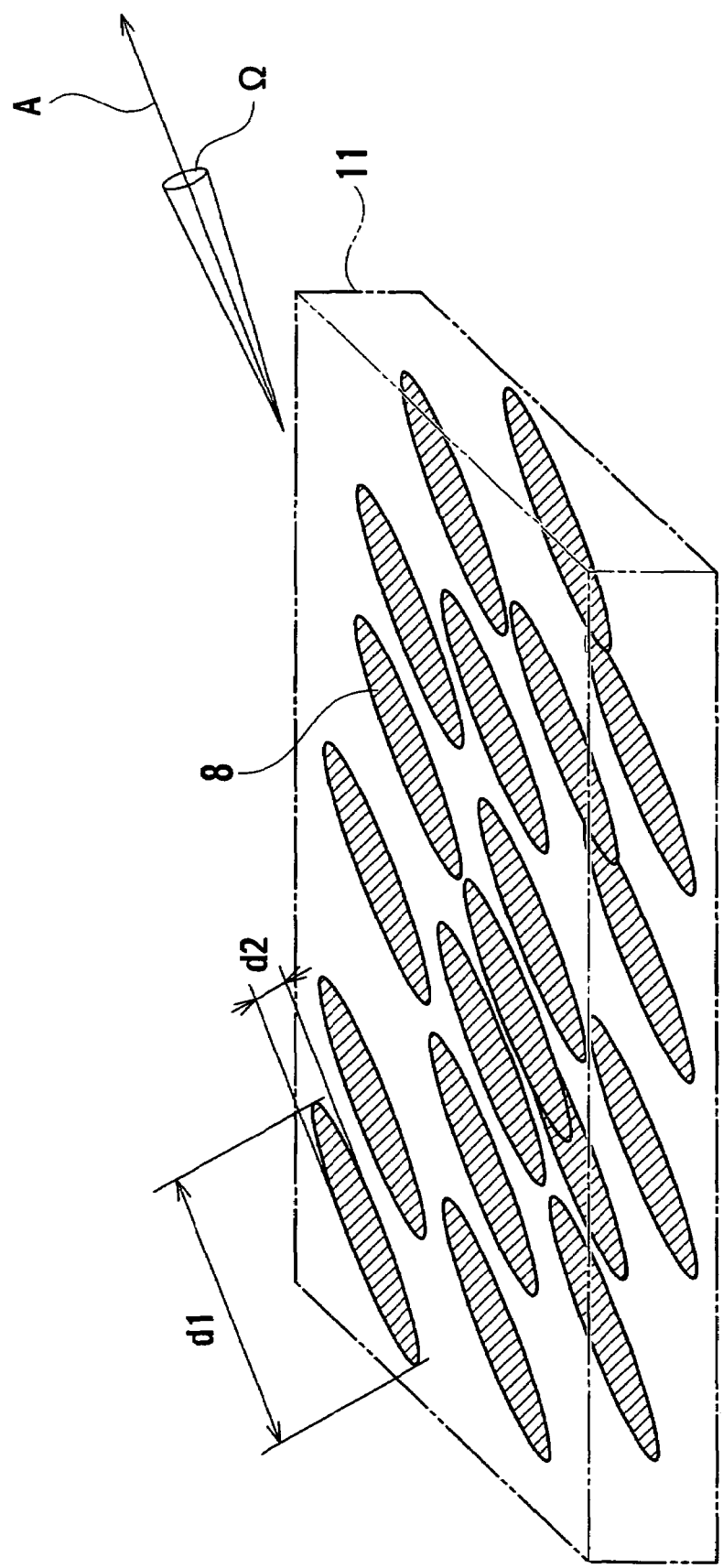
FIG. 4 is a schematic diagram showing a structure of an anisotropic porous material according to a first embodiment of the present invention.

FIG. 4 is a schematic diagram showing a structure of an anisotropic porous material of a first embodiment of the present invention. As shown in FIG. 4, the anisotropic porous material 11 of the first embodiment includes a plurality of oval spherical pores 8 shown in FIG. 3. The pores 8 included in the anisotropic porous material 11 shown in FIG. 4 are mainly closed pores, each entirely located inside the material.

It is preferable that a ratio d1/d2 (aspect ratio) between a major axis length d1 of the pore 8 and a minor axis length d2 thereof be 10 or more. In a case of the anisotropic porous material formed mainly of the closed pores, properties realized by the orientation are attributed to an anisotropic shape of each of the closed pores. In a case of the aspect ratio of less than 10, the properties as an anisotropic porous material cannot be fully achieved. This is because the anisotropic porous material including pores with the aspect ratio of less than 10 has properties closer to those of an isotropic porous material as a whole, even though the pores are arranged in an orientation.

In addition, assuming that orientations of the major axes of the respective pores are confined within a range of a solid angle O around an reference orientation axis A, it is preferable that the solid angle O be within a range of ±10°. In a case of an anisotropic porous material containing mainly of the closed pores whose major axis orientations vary larger than ±10°, the anisotropic porous material has properties closer to those of an isotropic porous material as a whole, even though each of the closed pores has a high aspect ratio. Thus, the properties as an anisotropic porous material cannot be fully achieved.

Moreover, it is preferable that the minor axis length d2 of each of the pores 8 be between 0.001 and 500 μm. In a case where the minor axis length d2 is shorter than 0.001 μm, it is necessary to control a form on the order of interatomic/intermolecular distance. This makes it difficult to realize a structure of the anisotropic porous material of the present invention as a practical material. On the other hand, in a case of an anisotropic porous material including pores each having the minor axis length d2 longer than 500 μm, the anisotropic porous material can be manufactured by an existing mechanical process such as punching process. This is not categorized in the anisotropic porous material of the present invention.

In addition, it is preferable that a variation of the minor axis lengths d2 of the respective pores is ±15% or less. In a case where the anisotropic porous material is composed mainly of the closed pores, the material has weak orientation properties as a whole, and has properties closer to those of an isotropic porous material, if the variation of diameters of the respective closed pores is more than ±15%. Thus, the properties as an anisotropic porous material cannot be fully achieved.

Figure 5:
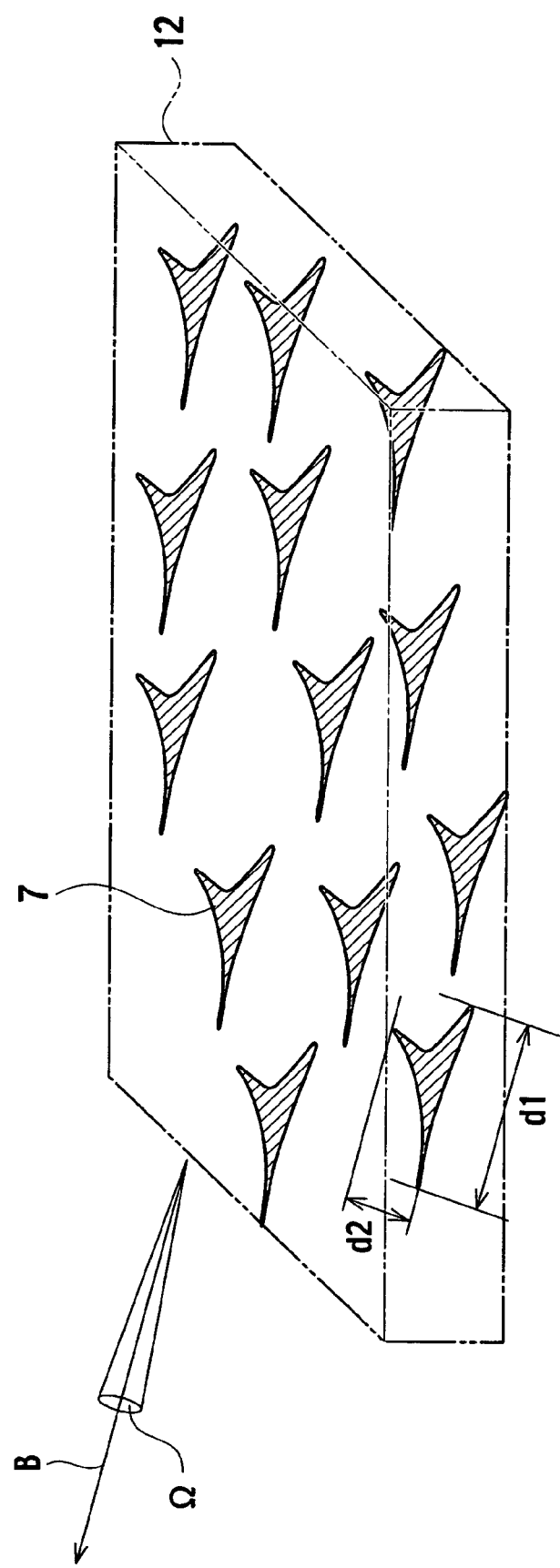
FIG. 5 is a schematic diagram showing a modified example of the first embodiment.

FIG. 5 is a schematic diagram showing a modified example of the first embodiment. As shown in FIG. 5, an anisotropic porous material 12 of the modified example of the first embodiment includes a plurality of pores 7 in an anisotropic shape shown in FIG. 2. The major axes d1 of the respective pores are arranged in an orientation of a reference axis B.

As is the case with the anisotropic porous material 11 shown in FIG. 4, the following numerical values are preferable even in the anisotropic porous material 12 shown in FIG. 5. An aspect ratio of each of the pores is 10 or more. The orientations of the major axes d1 of the respective pores 7 are confined within a range of a solid angle O of ±10° around the reference axis B. The minor axis lengths d2 of the respective pores 7 are between 0.001 and 500 μm. A variation of the minor axis lengths b of the respective pores is not more than ±15%. The reasons for selecting these numerical values are also the same as described above.

Second Embodiment

Figure 6:
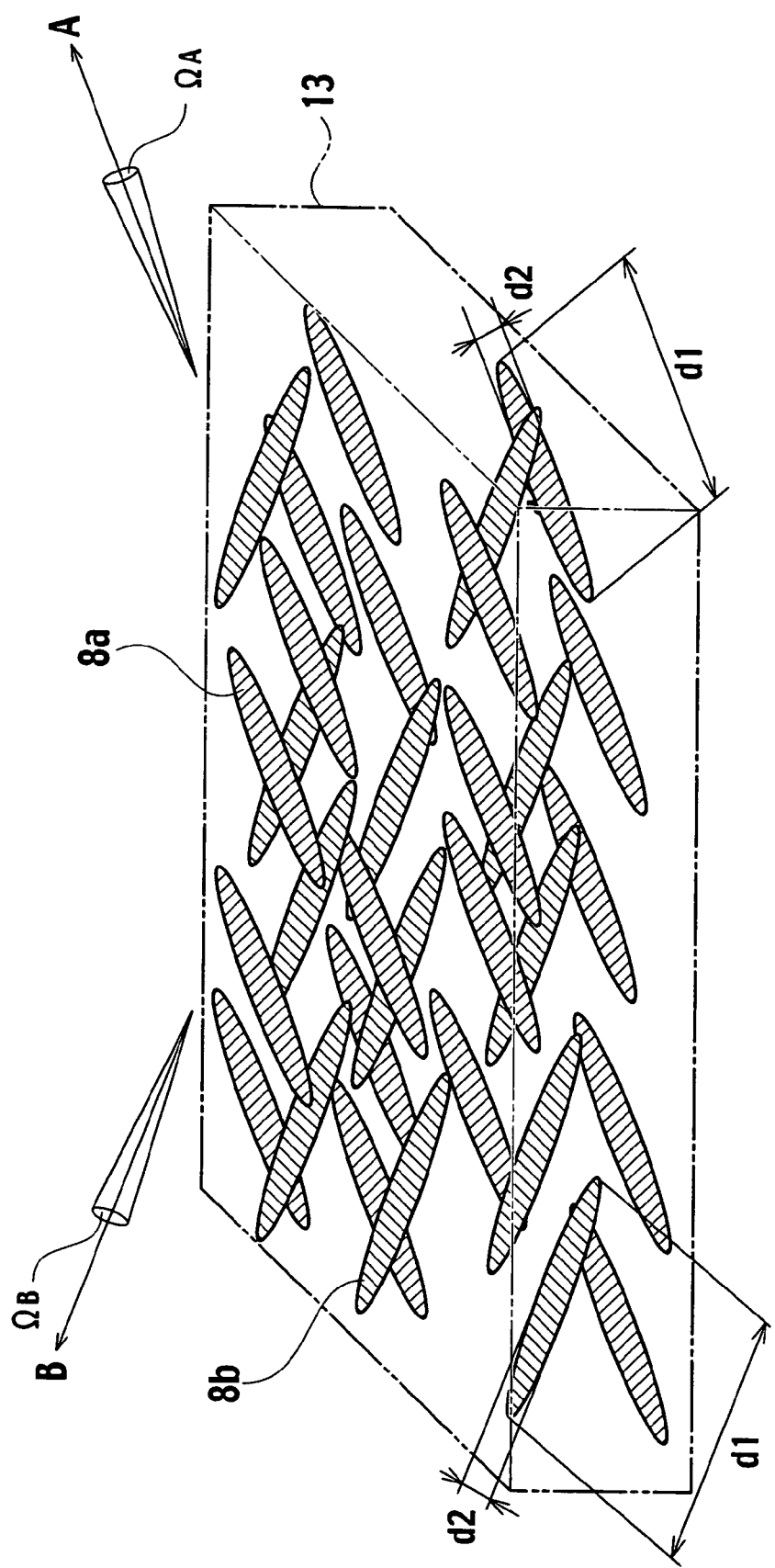
FIG. 6 is a schematic diagram showing a structure of an anisotropic porous material according to a second embodiment of the present invention.

FIG. 6 is a schematic diagram showing a structure of an anisotropic porous material 13 of a second embodiment of the present invention. As shown in FIG. 6, the anisotropic porous material 13 of the second embodiment includes a plurality of pores 8a and 8b, respectively. The pores included in the anisotropic porous material 13 are mainly closed pores. The pores 8a consist of a first orientation group in which the major axes are arranged in the orientation A. On the other hand, the pores 8b consist of a second orientation group in which the major axes are arranged in the orientation B which is different from the orientation A.

As is the case with the first embodiment, it is preferable that an aspect ratio d1/d2 of each of the pores 8a and 8b be 10 or more, and that the minor axis length d2 of each of the pores 8a and 8b be between 0.001 and 500 μm. The reasons for selecting these numerical values are also the same as those of the first embodiment.

Assuming that orientations of the major axes of the respective pores 8a in a first group of an orientation A are confined within a range of a solid angle $O_A$ around the first orientation axis A, it is preferable that the solid angle $O_A$ be within a range of ±10°. In addition, assuming that orientations of the major axes d1 of the respective pores 8a and 8b in a second group of an orientation B are confined within a range of a solid angle $O_B$ around the reference orientation axis B, it is preferable that the solid angle $O_B$ be within a range of ±10°. When the orientation of each orientation group has a variation of ±10° or more, the anisotropic porous material has properties closer to those of an isotropic porous material as a whole. Thus, the properties as the anisotropic porous material cannot be fully achieved.

In addition, it is preferable that a variation of the minor axis lengths d2 of the respective pores 8a and 8b be ±15% or less in the same orientation group. When the variation of the minor axis lengths d2 of the respective pores 8a and 8b is larger than ±15%, the anisotropic porous material has weak orientation properties as a whole, and has properties closer to those of an isotropic porous material. Thus, the properties as an anisotropic porous material cannot be fully achieved.

Third Embodiment

Figure 7:
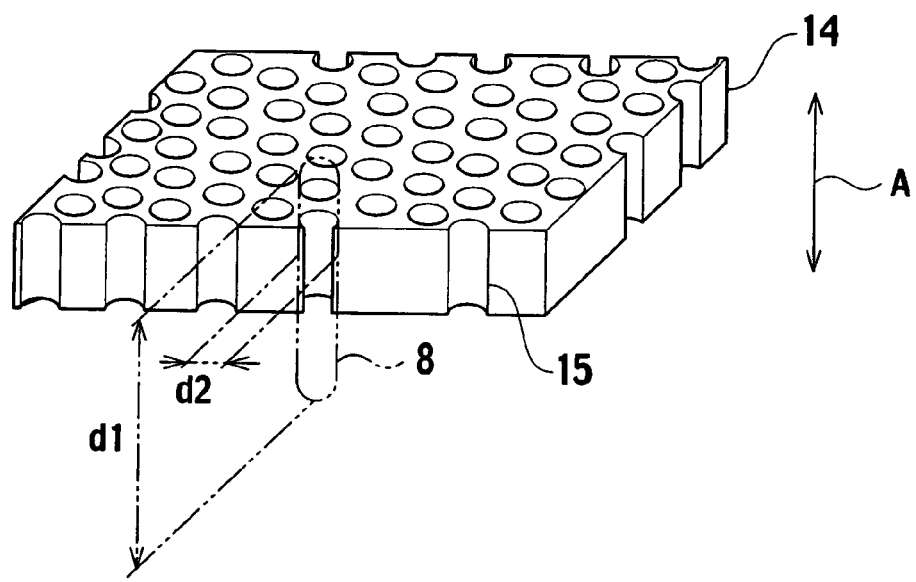
FIG. 7 is a schematic diagram showing a structure of an anisotropic porous material according to a third embodiment of the present invention.

FIG. 7 is a schematic diagram showing a structure of an anisotropic porous material 14 of a third embodiment of the present invention. As shown in FIG. 7, the anisotropic porous material 14 of the third embodiment has a plurality of through-pores 15. Each of the through-pores 15 is a pore whose two ends are respectively open to the surfaces of the material. The anisotropic porous material 14 of the third embodiment has a form obtained by cutting the anisotropic porous material of the first embodiment shown in FIG. 4 along two planes, which are vertical to the major axis orientation d1 of the pores 8, and which are parallel to each other.

It is preferable that an aspect ratio d1/d2 of the through-pore 15 be 10 or more. When the aspect ratio d1/d2 is 10 or more, it is possible to obtain an excellent membrane material having well-balanced strength properties suitable for filtering and the like.

In addition, it is preferable that orientations of the major axes of the respective through-pores be confined within a range of a solid angle of ±10°. The variation of the orientations of larger than ±10° deteriorates the distinctive properties. For example, pressure loss in filtering or the like becomes larger.

Moreover, it is preferable that the minor axis length of each of the through-pores 15 be between 0.001 and 500 μm. In a case where the minor axis length is shorter than 0.001 μm, it is necessary to control a form on the order of interatomic/intermolecular distance. This makes it difficult to realize a structure of the anisotropic porous material of the present invention as a practical material. On the other hand, in a case of an anisotropic porous material including pores each having the minor axis length longer than 500 μm, the anisotropic porous material can be manufactured by an existing mechanical process such as punching process. This is not categorized in the anisotropic porous material of the present invention.

Furthermore, it is preferable that a variation of the minor axis lengths of the respective through-pores 15 is ±15% or less. When the variation of the minor axis lengths is larger than ±15%, the distinctive properties are deteriorated. For example, separation accuracy in filtering or the like is reduced.

In addition, it is preferable that a ratio of the through-pores 15 to all the pores included in the anisotropic porous material 14 (through-pore ratio) be 70% or more. In a case where the through-pore ratio is less than 70%, flux in filtering is reduced, and effects of the pores (open pores and closed pores) other than the through-pores become obvious. To be more precise, the effects include deterioration of detergent properties in filtering or the like, and deterioration of membrane strength. The open pore means a pore, only one end of which is open to the surface of the material.

Figure 8:
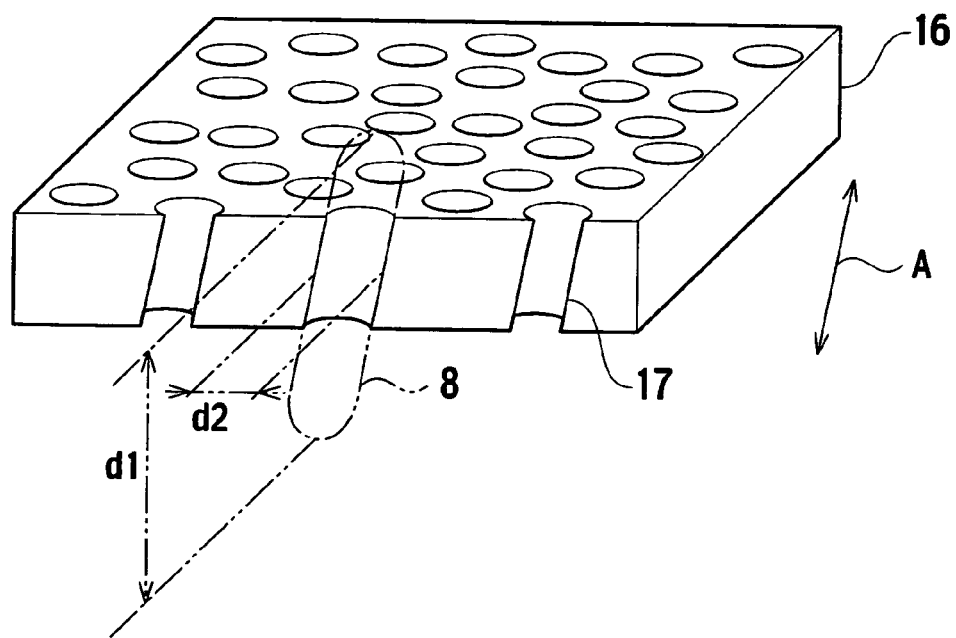
FIG. 8 is a schematic diagram showing a modified example of the third embodiment.

FIG. 8 is a schematic diagram showing a modified example of the third embodiment. As shown in FIG. 8, an anisotropic porous material 16 of the modified example of the third embodiment has a plurality of through-pores 17. The through-pores 17 are formed in the orientation that is not vertical to the upper and lower surfaces of the anisotropic porous material 16. The anisotropic porous material 16 of the modified example of the third embodiment has a form obtained by cutting the anisotropic porous material of the first embodiment shown in FIG. 4 along two planes, which are not vertical to the major axis orientation A of the pores, and which are parallel to each other.

Fourth Embodiment

Figure 9:
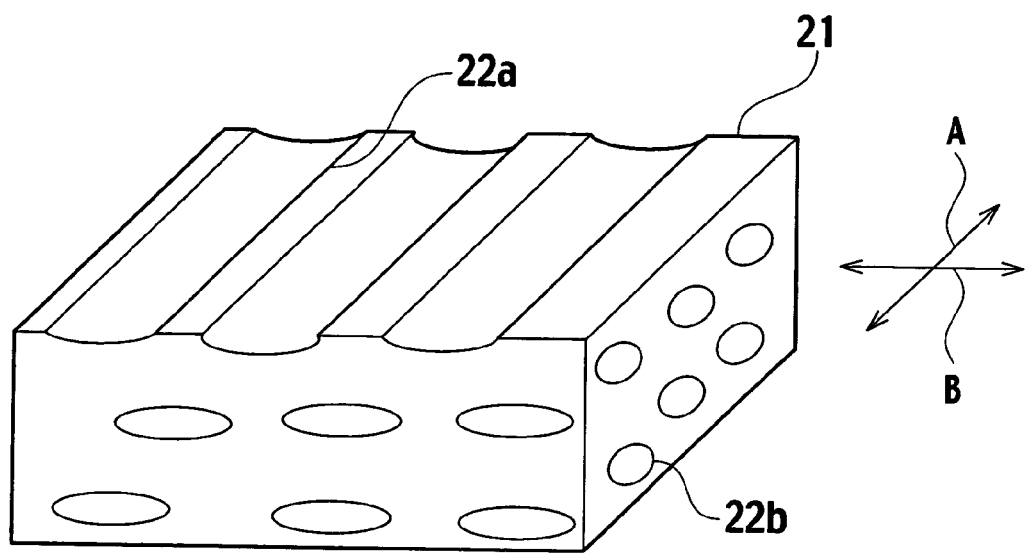
FIG. 9 is a schematic diagram showing a structure of an anisotropic porous material according to a fourth embodiment of the present invention.

FIG. 9 is a schematic diagram showing a structure of an anisotropic porous material 21 of a fourth embodiment of the present invention. As shown in FIG. 9, the anisotropic porous material 21 of the fourth embodiment has a plurality of through-pores 22a and 22b. The anisotropic porous material 21 of the fourth embodiment has a form obtained by cutting the anisotropic porous material 13 of the second embodiment shown in FIG. 6 along two planes parallel to each other. The through-pores 22a consist of a first group of an orientation A, and the though-pores 22b consist of a second group of an orientation B.

As is the case with the third embodiment, it is preferable that an aspect ratio of the through-pores 22a and 22b be 10 or more, that minor axis lengths d2 of the respective pores 22a and 22b be between 0.001 and 500 μm, and that a through-pore ratio in the same orientation group be 70% or more. The reasons for selecting these numerical values are also the same as those of the third embodiment.

In addition, in the same orientation group A or B, it is preferable that major axis orientations of the respective through-pores 22a or 22b be confined within a range of a solid angle of ±10° around an reference orientation axis A or B. When the variation in the orientation is larger than ±10°, the distinctive properties are deteriorated. For example, a pressure loss in filtering or the like becomes larger. In addition, it is preferable that the variation of the minor axis lengths d2 of the respective pores be ±15% or less in the same orientation group A or B. When the variation of the minor axis lengths is larger than 15%, the distinctive properties are deteriorated. For example, separation accuracy in filtering or the like is reduced.

Figure 10:
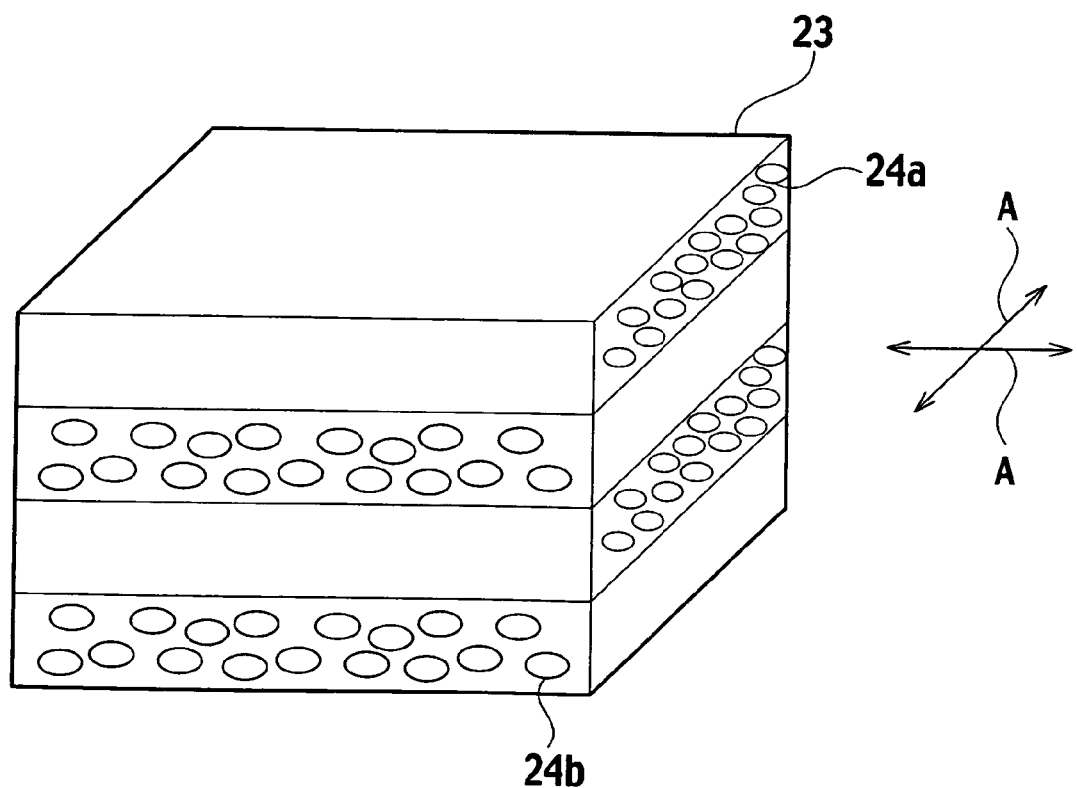
FIG. 10 is a schematic diagram showing a modified example of the fourth embodiment.

FIG. 10 is a schematic diagram showing a modified example of the fourth embodiment. FIG. 10 illustrates an anisotropic porous material 23 of the modified example of the fourth embodiment, which has through-pores 24a and 24b. Its form is obtained in the following manner. The anisotropic porous material of the first embodiment shown in FIG. 4 is cut along two planes parallel to each other. Then the cut layers of the anisotropic porous material are stacked on one another by altering the orientation of the through-pores at 90° layer by layer.

Figure 1A:
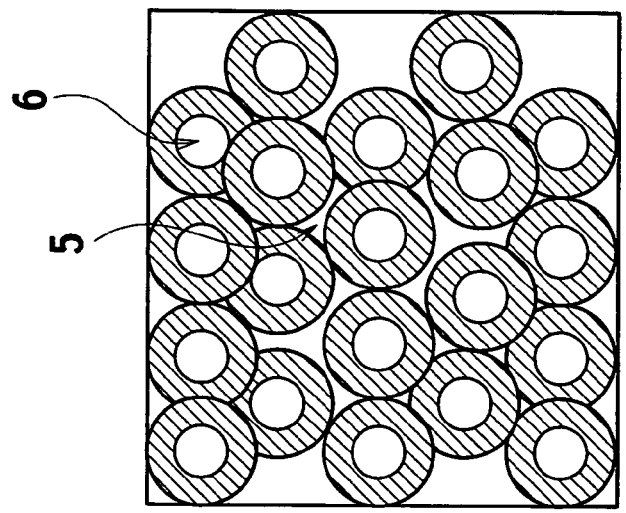
FIG. 1A is a schematic diagram showing a sinter-type porous material.
Figure 1B:
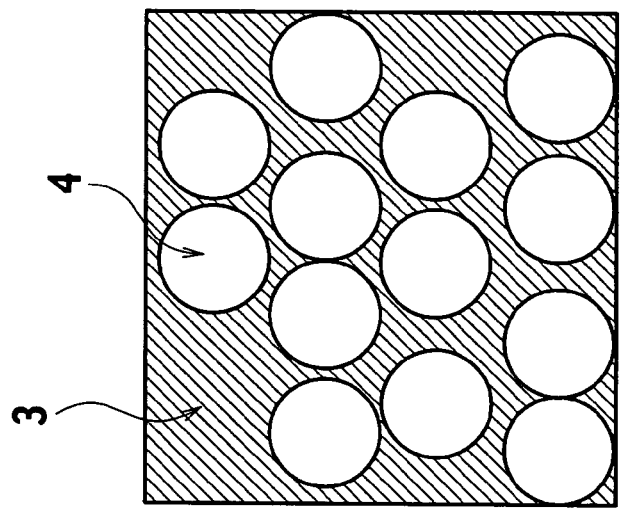
FIG. 1B is a schematic diagram showing a foam-type porous material.
Figure 1C:
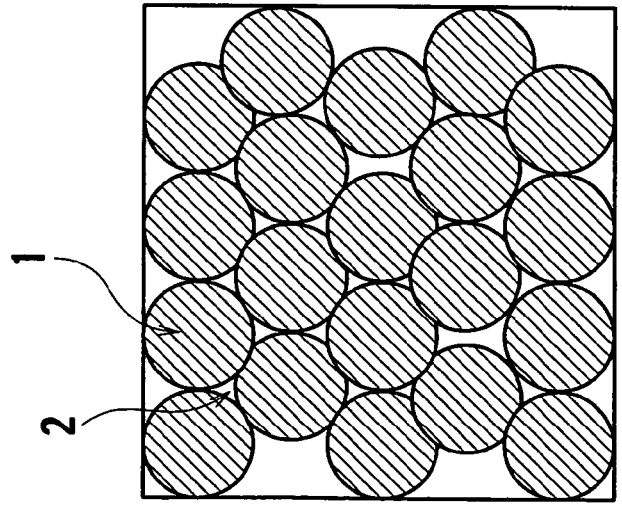
FIG. 1C is a schematic diagram showing a sinter-and-foam mixed phase type porous material.

The anisotropic porous material of the present invention is different from the general porous material shown in FIGS. 1A to 1C, or the existing porous material as represented by the porous membrane used for the purpose of water purification as described above. The different point is that pores having a large aspect ratio of major axis to minor axis are arranged in an orientation. Accordingly, when the anisotropic porous material including one-dimensional pores of each of the first and third embodiments is used for a fluid filter, fine particles and suspended materials are captured on the filter surface. Thus, the anisotropic porous material makes it possible to perform the separation process of a large amount of fluid with high accuracy, to reduce deterioration of flux, and to improve detergent properties of the filter.

In addition, when the anisotropic porous material including two-dimensional pores of each of the second and fourth embodiments is used as a heat exchange material, energy loss due to fluid resistance is greatly reduced. For this reason, a heat exchange efficiency per unit volume can be improved.

In addition, the anisotropic porous material of the present invention covers a wide range of usage. The anisotropic porous material including one-dimensional pores of each of the first and third embodiments can be used for various kinds of filters having various excellent characteristics. The filters can perform the separation process of a large amount of fluid with high accuracy and achieve high flux, while keeping excellent detergent properties.

In addition, the anisotropic porous materials including two-dimensional pores of each of the second and fourth embodiments can be used for a heat exchanger in which a heat exchange efficiency per unit volume is remarkably improved and energy loss due to fluid resistance is greatly reduced.

As a method of manufacturing the anisotropic porous material of the present invention, any one of the following methods can be used: a method using a template for forming pores or through-pores; a method of forming pores or through-pores by transferring; a method using a process of drawing an original texture of pores or through-pores; a method of forming pores or through-pores by using a crystal growth method; and a method of forming pores or through-pores by use of the gas-phase synthesis method.

Note that, in each of the above-described embodiments, the descriptions have been given of the anisotropic porous material consisted of one or two orientation groups of the pores. However, the number of the orientation groups to be classified is not limited to these numbers.

What is claimed is:

1. An anisotropic porous material made of metal or ceramics comprising a plurality of pores,
    wherein each of the pores has an anisotropic shape in which a major axis and a minor axis can be defined;
    the plurality of pores are arranged in an orientation;
    a ratio of the major axis length to the minor axis length of each of the pores is at least 10; and
    the orientation of the major axis is confined within a range of a solid angle of ±10°.

2. The anisotropic porous material made of metal or ceramics according to claim 1, wherein the minor axis lengths of the plurality of pores are between 0.001 and 500 μm.

3. The anisotropic porous material made of metal or ceramics according to any one of claims 1 and 2, wherein the plurality of pores are classified into at least one orientation group consisting of the pores whose major axis orientations are confined within a range of a solid angle of ±10°.

4. The an isotropic porous material made of metal or ceramics according to claim 3, wherein a variation of the minor axis lengths of the plurality of pores is ±15% or less in the same orientation group.

5. The anisotropic porous material made of metal or ceramics according to claim 3, wherein at least some of the plurality of pores belonging to the same orientation group are through-pores.

6. The anisotropic porous material made of metal or ceramics according to claim 5, wherein a variation of the minor axis lengths of the plurality of pores is ±15% or less in the same orientation group.

7. The anisotropic porous material made of metal or ceramics according to claim 5, wherein a through-pore ratio in the same orientation group is at least 70%.

8. The anisotropic porous material made of metal or ceramics according to claim 1, wherein the plurality of pores are classified into at least one orientation group consisting of the pores whose major axis orientations are confined within a range of a solid angle of ±10°.

9. The anisotropic porous material made of metal or ceramics according to claim 8, wherein a variation of the minor axis lengths of the plurality of pores is ±15% or less in the same orientation group.

10. The anisotropic porous material made of metal or ceramics according to claim 8, wherein at least some of the plurality of pores belonging to the same orientation group are through-pores.

11. The anisotropic porous material made of metal or ceramics according to claim 10, wherein a variation of the minor axis lengths of the plurality of pores is ±15% or less in the same orientation group.

12. The anisotropic porous material made of metal or ceramics according to claim 10, wherein a through-pore ratio in the same orientation group is at least 70%.

* * * * *